US009288710B1

(12) United States Patent
Narendran et al.

(10) Patent No.: US 9,288,710 B1
(45) Date of Patent: Mar. 15, 2016

(54) METHOD AND SYSTEM FOR LIMITING DOWNLINK DATA RATES

(71) Applicant: Sprint Spectrum L.P., Overland Park, KS (US)

(72) Inventors: Rajveen Narendran, Olathe, KS (US); Ryan S. Talley, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 368 days.

(21) Appl. No.: 13/689,462

(22) Filed: Nov. 29, 2012

(51) Int. Cl.
*H04W 28/02* (2009.01)

(52) U.S. Cl.
CPC .................................. *H04W 28/0236* (2013.01)

(58) Field of Classification Search
CPC ................ H04L 47/10; H04L 12/5602; H04L 2012/5636; H04L 2012/5632; H04Q 11/0478
USPC .......................................................... 370/232
See application file for complete search history.

(56) References Cited

U.S. PATENT DOCUMENTS

| | | | | |
|---|---|---|---|---|
| 7,907,958 | B2 | 3/2011 | Sampath et al. | |
| 8,310,929 | B1 | 11/2012 | Srinivas et al. | |
| 2008/0181302 | A1* | 7/2008 | Demircin et al. | 375/240.06 |
| 2010/0099406 | A1* | 4/2010 | Anantharaman et al. | 455/434 |
| 2011/0039544 | A1* | 2/2011 | Fulghum | 455/423 |
| 2012/0002614 | A1* | 1/2012 | Ekici et al. | 370/329 |
| 2012/0039176 | A1* | 2/2012 | Eshan et al. | 370/237 |
| 2013/0258877 | A1* | 10/2013 | Ji et al. | 370/252 |

OTHER PUBLICATIONS

Awal et al., “Dynamic CQI Resource Allocation for OFDMA Systems,” IEEE Wireless Communications and Networking Conference, pp. 795-780, 2011.
Mehlfuhrer et al., “Siumulating the Long Term Evolution Physical Layer,” 17th European Signal Processing Conference, pp. 1471-1478, 2009.
Aho et al., “CQI Reporting Imperfections and their Consequences in LTE Networks,” Proc. of the IARIA Tenth International Conference on Networks, pp. 241-245, 2011.
Kawser et al., “Downlink SNR to CQI Mapping for Different Multiple Antenna Techniques in LTE,” International Journal of Information and Electronics Engineering, vol. 2, No. 5, pp. 757-760, Sep. 2012.
“Method and System with Adjusted Power Headroom Reports for Uplink Resource Allocation,” U.S. Appl. No. 13/528,305, filed Jun. 20, 2012.

* cited by examiner

*Primary Examiner* — Charles C Jiang
*Assistant Examiner* — Thad Defauw

(57) ABSTRACT

A wireless communication device (WCD) stores a mapping that maps each of a plurality of ranges of signal-to-noise ratios (SNRs) to a respective data rate indicator in a plurality of data rate indicators. Each data rate indicator is associated with a respective modulation-and-coding scheme (MCS) that supports a respective downlink data rate from a radio access network (RAN). The WCD selects a maximum data rate indicator based on a type of application on the WCD that is to receive downlink data, a priority of downlink data to be received by the application, an amount of downlink data to be received by the application, a device type of the WCD, or a subscription level of the WCD. The WCD selects an applicable data rate indicator based on a measured SNR and the mapping, such that the applicable data rate indicator does not exceed the maximum data rate indicator.

16 Claims, 5 Drawing Sheets

10

METHOD AND SYSTEM FOR LIMITING DOWNLINK DATA RATES

BACKGROUND

In certain types of air interfaces, parameters that define how communications are conducted on the downlink and/or uplink can be adjusted dynamically to adapt to changing radio frequency (RF) conditions. Such dynamic adjustment of parameters can involve adaptive coding and modulation (ACM) techniques, in which the type of modulation and/or coding is adjusted based on RF conditions. Changing the modulation and/or coding that is used over a communication link (such as the uplink or downlink) can result in a change in the effective data rate over the link. For example, if RF conditions are poor, the modulation and/or coding may be adjusted to make the wireless signals less sensitive to noise, fading, or other adverse RF effects, but at the expense of a lower effective data rate. On the other hand, if RF conditions are good, the modulation and/or coding may be adjusted to allow for a higher effective data rate, but at the expense of having the wireless signals more sensitive to noise, fading, or other adverse RF effects.

To adapt downlink communications to RF conditions, a wireless communication device (WCD) can transmit to the radio access network (RAN) an indication of the modulation-and-coding scheme (MCS) to be used for the RAN's downlink communications to the WCD. This approach is used in, for example, Long Term Evolution (LTE) air interfaces. LTE defines a series of channel quality indicator (CQI) indices for controlling the MCS and, hence, the data rate used for downlink communications. The CQI indices for downlink communications range from 0 to 15 (a CQI index of 0 indicates no transmission), with higher data rate indicators being associated with MCSs that support higher downlink data rates. In operation, a WCD may measure a signal-to-noise ratio (SNR) of a reference signal transmitted by the RAN, select a CQI index based on the measured SNR, and report the selected CQI index to the RAN. In response, the RAN may transmit downlink data to the WCD using the MCS associated with the CQI index that the WCD reported.

OVERVIEW

In a first principal aspect, an exemplary embodiment provides a method for a wireless communication device (WCD). The WCD stores a mapping between a plurality of ranges of signal-to-noise ratios (SNRs) and a plurality of data rate indicators, wherein the mapping maps each range of SNRs with a respective data rate indicator, and wherein each data rate indicator is associated with a respective modulation-and-coding scheme (MCS) that supports a respective downlink data rate, such that higher data rate indicators are associated with MCSs that support higher downlink data rates. The WCD identifies an application on the WCD that is to receive downlink data from a radio access network (RAN). The WCD selects a maximum data rate indicator from among the plurality of data rate indicators based on at least one of a type of the application, a priority of downlink data to be received by the application, an amount of downlink data to be received by the application, a device type of the WCD, or a subscription level of the WCD. The WCD measures a SNR of a signal transmitted by the RAN. The WCD selects an applicable data rate indicator based on at least the measured SNR, the mapping, and the maximum data rate indicator, such that the applicable data rate indicator does not exceed the maximum data rate indicator. The WCD reports the applicable data rate indicator to the RAN.

In a second principal aspect, an exemplary embodiment provides a method for communicating with a radio access network (RAN) that recognizes a plurality of channel quality indicator (CQI) indices, wherein the CQI indices range from a lowest CQI index to a highest CQI index, and wherein each CQI is associated with a respective modulation-and-coding scheme (MCS) that supports a respective downlink data rate. A wireless communication device (WCD) identifies an application on the WCD that is to receive downlink data from the RAN. The WCD selects a maximum CQI index based on at least a type of the application. The WCD measures a signal-to-noise ratio (SNR) of a signal transmitted by the RAN. The WCD selects an applicable CQI index based on at least the measured SNR and the maximum CQI index, such that the applicable CQI index does not exceed the maximum CQI index. The WCD reports the applicable CQI index to the RAN.

In a third principal aspect, an exemplary embodiment provides a wireless communication device (WCD). The WCD comprises a transceiver for wireless communication with a radio access network (RAN); a processor; data storage; a mapping stored in the data storage; and program instructions stored in the data storage. The mapping maps each range of signal-to-noise ratios (SNRs) in a plurality of ranges of SNRs to a respective data rate indicator in a plurality of data rate indicators. Each data rate indicator is associated with a respective modulation-and-coding scheme (MCS) that supports a respective downlink data rate, such that higher data rate indicators are associated with MCSs that support higher downlink data rates. The program instructions are executable by the processor to cause the WCD to perform functions comprising: (a) identifying an application on the WCD that is to receive downlink data from the RAN; (b) selecting a maximum data rate indicator from among the plurality of data rate indicators based on at least one of a type of the application, a priority of downlink data to be received by the application, an amount of downlink data to be received by the application, a device type of the WCD, or a subscription level of the WCD; (c) measuring a SNR of a signal transmitted by the RAN and received by the transceiver; (d) selecting an applicable data rate indicator based on at least the measured SNR, the mapping, and the maximum data rate indicator, such that the applicable data rate indicator does not exceed the maximum data rate indicator; and (e) causing the transceiver to report the applicable data rate indicator to the RAN.

DETAILED DESCRIPTION OF EXAMPLE EMBODIMENTS

1. Introduction

Figure 1:
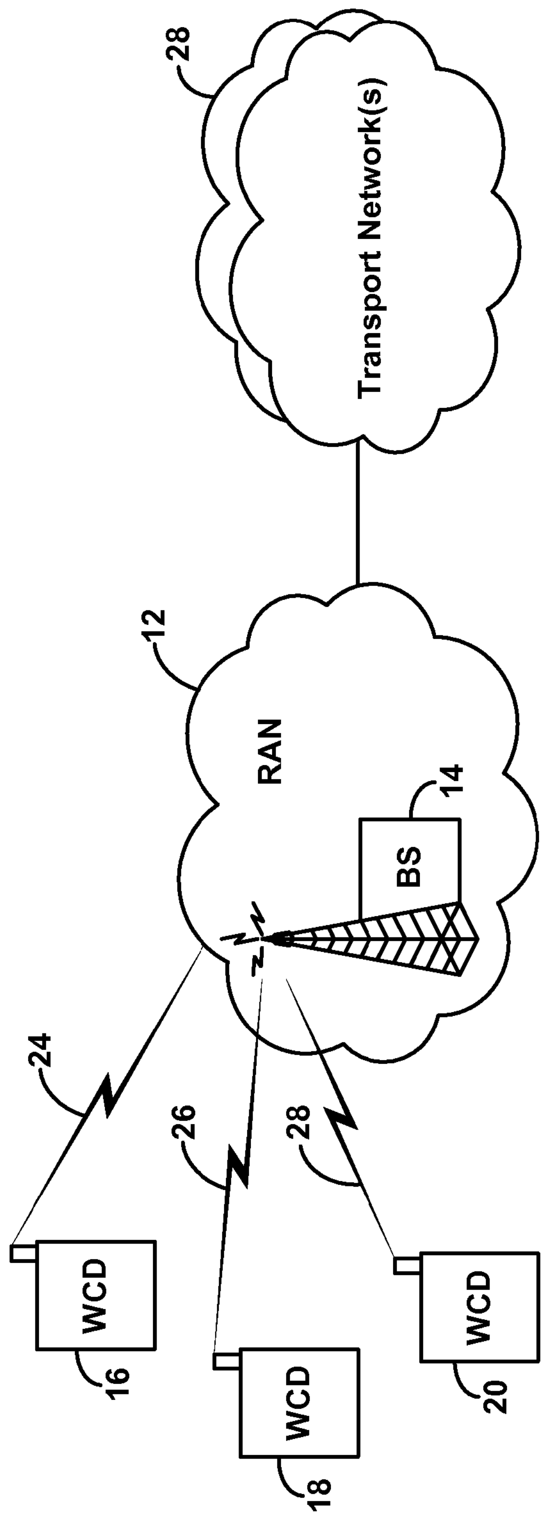
FIG. 1 is a block diagram of a communication system, in accordance with an example embodiment.

The inventors have recognized that conventional ACM methods, which select a data rate based on RF conditions rather than based on the need for a particular data rate, can result in inefficient use of air interface resources. For example, if a WCD is using a bandwidth-intensive application, such as a video conferencing application, it may make sense for the RAN to transmit data to the WCD at the highest data rate that the RF conditions can support. On the other hand, if the WCD is using a low-bandwidth application, such as synching e-mail messages or Web browsing, the WCD does not necessarily need the highest available data rate. If the WCD only needs a relatively low data rate, but a relatively high data rate is selected because of good RF conditions, the result can be an inefficient use of the RAN's air interface resources. In addition, the unnecessarily high data rate can drain the WCD's battery unnecessarily.

To address such inefficiencies, the inventors propose methods and systems that can select a data rate based on one or more considerations in addition to the RF conditions. Such considerations can take into account whether a WCD needs to receive data at a relatively high data rate based on, for example, the type of application being used on the WCD, the priority of the data, the amount of data, the device type of the WCD, and/or the subscription level of the WCD. The result of taking such considerations into account can be that the WCD selects a data rate that is less than the data rate that is supported by the RF conditions.

In an example embodiment, the WCD selects a downlink data rate by selecting an applicable data rate indicator from among a plurality of data rate indicators. Each data rate indicator is associated with a respective MCS that supports a respective downlink data rate, such that higher data rate indicators are associated with MCSs that support higher downlink data rates. The data rate indicators could be, for example, CQI indices. To account for the RF conditions, as indicated by a SNR that the WCD measures for a reference signal transmitted by the RAN, the WCD may refer to a mapping that maps each range of SNRs in a plurality of SNR ranges to a respective data rate indicator in the plurality of data rate indicators. The WCD may use the mapping to map the measured SNR to a mapped data rate indicator. The mapped data rate indicator would indicate a data rate that is supported by the RF conditions reflected by the measured SNR.

However, to account for the possibility that the mapped data rate indicator indicates an unnecessarily high data rate, the WCD may also select a maximum data rate indicator. The WCD may select the maximum data rate indicator based on, for example, the type of application on the WCD that is to receive the data. Alternatively of additionally, the WCD may select the maximum data indicator based on other considerations, such as the priority of the data, the amount of data, the device type of the WCD, and/or the subscription level of the WCD. The WCD may compare the mapped data rate indicator to the maximum data rate indicator. If the mapped data rate indicator is less than or equal to the maximum data rate indicator, then the WCD may select the mapped data rate indicator as the applicable data rate indicator. On the other hand, if the mapped data rate indicator is greater than the maximum data rate indicator, then the WCD may select the maximum data rate indicator as the applicable data rate indicator. In this way, the WCD can select an applicable data rate indicator based on the measured SNR, the mapping, and the maximum data rate indicator, such as that the applicable data rate indicator does not exceed the maximum data rate indicator.

Once the WCD has selected the applicable data rate indicator, the WCD reports the applicable data rate indicator to the RAN. The RAN may then transmit downlink data to the WCD, using the MCS associated with the applicable data rate indicator reported by the WCD. While the application is still in use on the WCD, the WCD may continue taking SNR measurements of the RAN's reference signals, selecting applicable data rate indicators based on the measured SNRs and the maximum data rate indicator, and reporting the applicable data rate indicators. If, however, the WCD's data rate needs change, for example, as a result of a different type of application being used on the WCD, the WCD may select a new maximum data rate indicator and continue the process selecting and reporting applicable data rate indicators based on the new maximum data rate indicator. In this way, the WCD may receive downlink data at data rates that are based not only on the RF conditions but also on the type of application being used on the WCD and/or other considerations.

2. Example Communication System

FIG. 1 is a block diagram of a communication system 10 in which exemplary embodiments may be employed. Communication system 10 includes a radio access network (RAN) 12 that includes one or more entities that can communicate over an air interface, as exemplified by base station (BS) 14. RAN 12 could also include one or more control entities, such as a base station controller (BSC) or radio network controller (RNC). BS 14 could be, for example, a base transceiver station, a wireless access point, an access node, a Node-B, or an eNodeB. Although FIG. 1 shows only one base station in RAN 12, it is to be understood that RAN 12 could include any number of base stations.

BS 14 radiates to define one or more wireless coverage areas within which BS 14 can wirelessly communicate with WCDs. The wireless coverage area defined by BS 14 could be a cell that generally surrounds BS 14. Alternatively, BS 14 may define multiple wireless coverage areas, such as sectors. Each sector may be defined by multiple antennas in BS 14 so as to generally correspond to a range of azimuthal angles (e.g., 120°) about BS 14.

For purposes of illustration, BS 14 is shown as being in wireless communication with WCDs 16, 18, and 20 via respective air interfaces 22, 24, and 26. WCDs 16, 18, and 20 could be wireless telephones, wireless handheld or laptop computers, or other types of wireless communication devices. In some cases, a WCD could be referred to as a UE. Although FIG. 1 shows BS 14 in wireless communication with three WCDs, it is to be understood that BS 14 could be in wireless communication with a greater or fewer number of WCDs. In addition, the number of WCDs in wireless communication with BS 14 can change over time, for example, as a result of one or more WCDs moving into or out of the wireless coverage area of BS 14 and/or as a result of one or more WCDs beginning or ending communication sessions.

Each of air interfaces 22, 24, and 26 could include a respective uplink, with which a WCD can transmit data to BS 14, and a respective downlink, with which BS 14 can transmit data to a WCD. The communications over air interfaces 22, 24, and 26 could conform to any wireless protocol now known or later developed. For purposes of illustration, the communications over air interfaces 22, 24, and 26 will be described herein with respect to the LTE protocol.

RAN 12 may provide access to one or more transport networks 28, which could include, for example, the public switched telephone network (PSTN) and/or the Internet or other packet-switched networks. With this arrangement, a WCD being served by BS 14 may engage in a communication session, via RAN 12, with an endpoint connected to one of transport networks 28. The endpoint could be, for example, another WCD, a landline telephone, an email server, Web server, media server, or gaming server. The communication session could involve voice, text, images, video, data, or other media that is transferred from the WCD to the endpoint and/or from the endpoint to the WCD.

Thus, when a WCD, such as WCD 16, 18, or 20, is involved in a communication session, the WCD may transmit data over an uplink channel to BS 14 and may receive data from BS 14 over a downlink channel. The communication session could involve one or more applications on the WCD, such as a voice communication application or Web browsing application.

In some implementations, BS 14 may transmit data to WCDs 16, 18, and 20 over a downlink shared channel. The usage of the downlink shared channel may be controlled by BS 14 or by some other entity in wireless network 12. For example, the LTE protocol defines a Physical Downlink Shared Channel (PDSCH) that a base station can use to transmit data to multiple WCDs that are operating in its wireless coverage area. Portions of the PDSCH may be allocated to particular WCDs in the form of downlink resource blocks. In addition to receiving data in the PDSCH channel, a WCD may receive control signals in downlink control channels, such as a Physical Control Format Indicator Channel (PCFICH), a Physical Downlink Control Channel (PDCCH), and a Physical Hybrid ARQ Indicator Channel (PHICH).

Figure 2A:
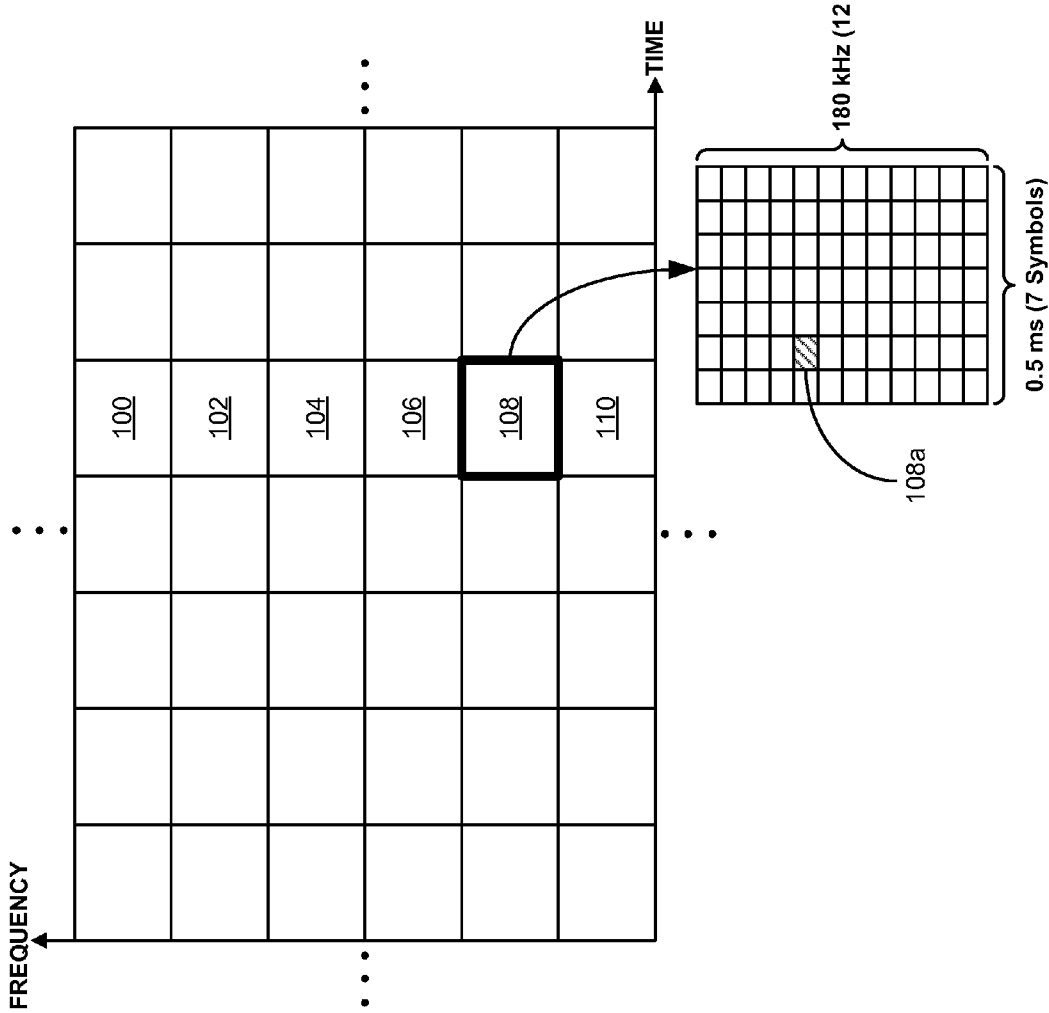
FIG. 2A is a conceptual illustration of a division of a shared downlink channel into downlink resource blocks, in accordance with an example embodiment.

FIG. 2A illustrates how the downlink resources in a given wireless coverage area may be divided in time and frequency domains into resource blocks. In an LTE air interface, data is transmitted on both the uplink and the downlink in the form of orthogonal frequency division multiplexing (OFDM) symbols. Each OFDM symbol is formed from a plurality of sub-carriers, typically 12 sub-carriers, each with a bandwidth of 15 kHz. Thus, a resource block corresponds to a plurality of sub-carriers that are used to form an OFDM symbol and has a duration that can accommodate a particular number of OFDM symbols.

In the time domain, each resource block typically occupies a 0.5 ms slot of time. By way of example, FIG. 2A shows resource blocks 100-110 for a particular slot. In the frequency domain, each of resource blocks 100-110 occupies a respective portion of frequency bandwidth, typically 180 kHz in LTE implementations. Although FIG. 2A shows six resource blocks in each slot, a wireless coverage area could have a greater number of resource blocks, as indicated by the dots above and below resource blocks 100-110.

FIG. 2A also includes a more detailed view of downlink resource block 108. This detailed view shows that the 180 kHz of frequency bandwidth corresponds to 12 sub-carriers of 15 kHz each. Further, in this example, the 0.5 ms slot of time corresponds to the duration of seven OFDM symbols. In other examples, a 0.5 ms slot could correspond to a different number of OFDM symbols. Thus, a resource block may be described as a set of resource elements, with each resource element corresponding to one modulated sub-carrier in an OFDM symbol. The detailed view of downlink resource block 108 in FIG. 2A shows the division of the resource block into multiple resource elements, such as resource element 108*a*.

Each sub-carrier symbol or resource element represents a data block of a certain number of bits, depending on the type of modulation that is used. For example, if Quadrature Phase Shift Keying (QPSK) is used for the sub-carrier symbols, then each sub-carrier symbol represents two bits of data. If Quadrature Amplitude Modulation (QAM) is used for the sub-carrier symbols, then each sub-carrier symbol represents a greater number of bits: four bits per symbol for 16QAM and six bits per symbol for 64QAM.

Figure 2B:
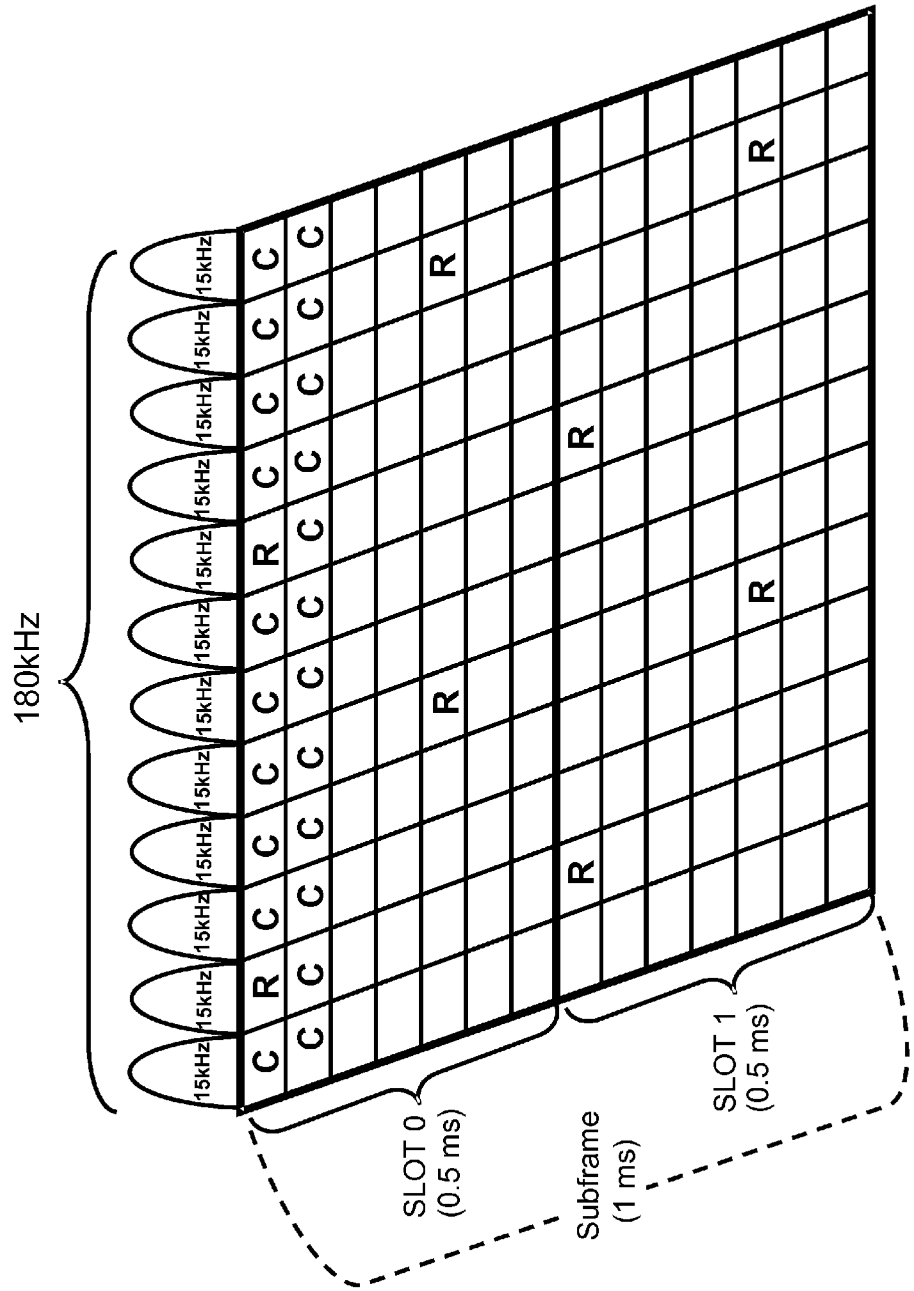
FIG. 2B is a conceptual illustration of two sequential downlink resource block, in accordance with an example embodiment.

Different resource elements in a downlink resource block may be used for different purposes. FIG. 2B illustrates different functions among the resource elements in two successive downlink resource blocks (a slot 0 resource block and a slot 1 resource block) for a one antenna port system. In this example, some of the resource elements are labeled "R" to indicate that they are reserved for reference signals used for channel estimation. In addition, some of the resource elements in the first two OFDM symbols are labeled "C" to indicate that they are used to transmit control signaling (PCFICH, PDCCH, and PHICH channels). The other resource elements that are unlabeled can be used to transmit user data (PDSCH channel). It is to be understood that FIG. 2B illustrates only one possible configuration. In other configurations, a downlink resource block could have a greater or fewer number of resource elements available to transmit user data.

A resource block may be allocated to a particular WCD to receive data in the downlink shared channel (PDSCH channel). For example, resource blocks 100 and 102 might be allocated to WCD 16, resource blocks 104-108 might be allocated to WCD 18, and resource block 110 might be allocated to WCD 20. The allocation of resource blocks to WCDs could be made by BS 14 or by some other entity in wireless network 12.

The determination of how to allocate downlink resource blocks among WCDs, such as WCDs 16, 18, and 20 being served by BS 14, could be made based on various factors. Such factors could include, for example, the amount of data that each WCD is to receive, the type of data that each WCD is to receive (e.g., whether the data is real-time data or non-real-time data), and the radio frequency (RF) conditions at each WCD. BS 14 or some other entity in RAN 12 may determine the RF conditions at the WCDs based on reports transmitted by the WCDs. For example, in the LTE approach, each WCD can transmit a Channel Quality Indicator (CQI) index that indicates the downlink data rate that the WCD can support, given the SNR at the WCD's location and the characteristics of the WCD's receiver. A WCD may determine the SNR by measuring one or more reference signals, such as one or more of the reference signals labeled "R" in FIG. 2B. The WCD may determine a signal-to-noise ratio (SNR) of the reference signal (where the "noise" can also include an interference component) and determine a corresponding CQI index, for example, based on a mapping of ranges of SNRs to CQI indices.

The CQI indices for downlink data transmissions range from 1 (indicating the lowest data rate) to 15 (indicating the highest data rate). There is also a CQI index of 0 that indicates no downlink transmission. Each non-zero CQI index is associated with a particular modulation scheme (QPSK, 16QAM, or 64QAM) and a particular code rate. The combination of modulation scheme and code rate, also known as the modulation-and-coding scheme (MCS), results in a particular number of information bits per resource element, which, in turn, defines the downlink data rate. Thus, higher CQI indices are associated with MCSs that support higher downlink data rates. An example of how CQI indices may be associated with a modulation scheme, code rate, and data rate (in terms of information bits per resource element) is shown below in Table 1.

TABLE 1

| CQI index | Modulation | Approximate code | Information bits per rateresource element |
|---|---|---|---|
| 0 | N/A | N/A | N/A |
| 1 | QPSK | 0.076 | 0.1523 |

TABLE 1-continued

| CQI index | Modulation | Approximate code | Information bits per rateresource element |
|---|---|---|---|
| 2 | QPSK | 0.12 | 0.2344 |
| 3 | QPSK | 0.19 | 0.3770 |
| 4 | QPSK | 0.30 | 0.6016 |
| 5 | QPSK | 0.44 | 0.8770 |
| 6 | QPSK | 0.59 | 1.1758 |
| 7 | 16 QAM | 0.37 | 1.4766 |
| 8 | 16 QAM | 0.48 | 1.9141 |
| 9 | 16 QAM | 0.60 | 2.4063 |
| 10 | 64 QAM | 0.45 | 2.7305 |
| 11 | 64 QAM | 0.55 | 3.3223 |
| 12 | 64 QAM | 0.65 | 3.9023 |
| 13 | 64 QAM | 0.75 | 4.5234 |
| 14 | 64 QAM | 0.85 | 5.1152 |
| 15 | 64 QAM | 0.93 | 5.5547 |

When the RAN receives a reported CQI index from a WCD for which the RAN has allocated a downlink resource block, the RAN may use the MCS associated with the reported CQI index in the resource elements of that resource block. For example, if a WCD reports a CQI index of 3, the RAN may use QPSK to modulate the sub-carriers in a downlink resource block allocated to the WCD and may use a code rate of approximately 0.19. This MCS results in the resource block having 0.377 information bits per resource element. Assuming that the resource block occupies ones slot and has 80 resource elements that carry user data (i.e., 4 of the resource elements are used for reference symbols), then the effective data rate would be about 30 bits per slot. If the WCD subsequently reports a CQI index of 12, then the RAN may use 64QAM to modulate the sub-carriers in a subsequent resource block allocated to the WCD and may use a code rate of approximately 0.65. This MCS results in the resource block having 3.9023 information bits per resource element. Assuming, as before, that the resource block has 80 resource elements that carry user data, then the effective data rate would be about 312 bits per slot. In this way, a WCD receives data from the RAN at a data rate that is dependent on the CQI index that the WCD reports to the RAN.

3. Example Methods

Figure 3:
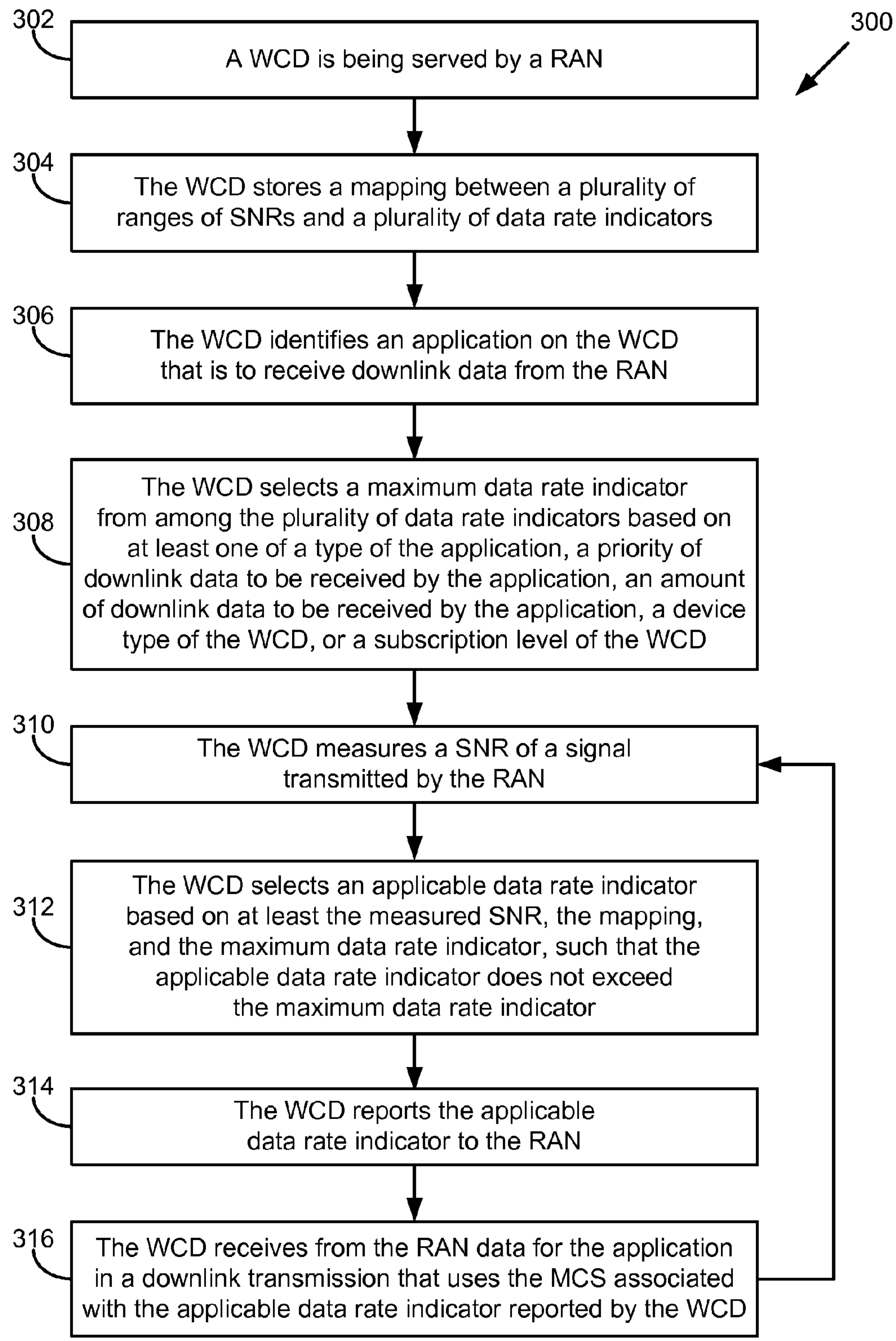
FIG. 3 is a flow chart of a method, in accordance with an example embodiment.

FIG. 3 is a flow chart illustrating an example method 300 that may be performed by a WCD. For purposes of illustration, the example is described with reference to the configuration of communication system 10 shown in FIG. 1 and the type of downlink resource allocations shown in FIGS. 2A and 2B. It is to be understood, however, that differently configured communication systems and/or other types of downlink resource allocations could be used.

Method 300 begins with a WCD that is being served by a RAN (e.g., WCD 16 being served by BS 14 in RAN 12), as indicated by block 302. The WCD stores a mapping between a plurality of ranges of SNRs and a plurality of data rate indicators, as indicated by block 304. The WCD could obtain the mapping in various ways. For example, the mapping could be provisioned in the WCD in connection with service activation on the WCD, or the WCD could receive the mapping from the RAN. The WCD could obtain the mapping in other ways as well.

In an example embodiment, the data rate indicators are CQI indices, such as shown above in Table 1. Thus, each data rate indicator in the mapping could be associated with a respective MCS that supports a respective downlink data rate, such that higher data rate indicators are associated with MCSs that support higher downlink data rates. An example of a mapping between ranges of SNRs and CQI indices is shown below in Table 2.

TABLE 2

| SNR range (in dB) | CQI index |
|---|---|
| −7.0 to −5.0 | 1 |
| −5.0 to −3.0 | 2 |
| −3.0 to −1.0 | 3 |
| −1.0 to 1.0 | 4 |
| 1.0 to 3.0 | 5 |
| 3.0 to 5.0 | 6 |
| 5.0 to 7.0 | 7 |
| 7.0 to 9.0 | 8 |
| 9.0 to 11.0 | 9 |
| 11.0 to 13.0 | 10 |
| 13.0 to 15.0 | 11 |
| 15.0 to 17.0 | 12 |
| 17.0 to 19.0 | 13 |
| 19.0 to 21.0 | 14 |
| >21.0 | 15 |

As shown in Table 2, the mapping can map each SNR range to a particular CQI index. Thus, the WCD can select a CQI index based on a measured SNR by determining which particular SNR range the measured SNR falls within and then which CQI index is associated with the particular SNR range in the mapping. It is to be understood, however, that Table 2 is only one example of a possible mapping. Other mappings could map other SNR ranges to CQI indices. In addition, a mapping could map SNR ranges to other types of data rate indicators and/or could include a greater or fewer number of data rate indicators than the 15 CQI indices shown in Table 2.

At some point, the WCD identifies an application on the WCD that is to receive downlink data from the RAN, as indicated by block 306. The WCD then selects a maximum data rate indicator from among the plurality of data rate indicators, as indicated by block 308. The maximum data rate indicator could correspond to the highest data rate indicator, i.e., the data rate indicator in the mapping that is associated with the MCS that supports the highest data rate. For example, in the mapping shown above in Table 2, the highest data rate indicator is 15. Thus, the maximum data rate indicator could be 15 for a mapping involving CQI indices, as shown in Table 2. However, the maximum data rate indicator could also be less than the highest data rate indicator. Thus, for the mapping shown in Table 2, the maximum data rate indicator could be a CQI index of 14 or less.

Whether the WCD selects the highest data rate indicator or some other data rate indicator as the maximum data rate indicator could be based on one or more considerations. For example, the WCD could select the maximum data rate indicator based on the type of the application on the WCD that is to receive downlink data from the RAN. In this regard, each application on the WCD that has the potential to receive downlink data from the RAN could be associated with a respective maximum data rate indicator. Highly bandwidth-intensive applications, such as video conferencing, video streaming applications, and other real-time visualization applications could have maximum data rate indicators that are the same as (or close to) the highest data rate indicator. Thus, for the mapping shown in Table 2, the maximum data rate indicator for highly bandwidth-intensive applications could be a CQI index of 15. Other real-time applications, such voice-over-Internet-protocol (VoIP), Internet radio, and gaming applications, could also have maximum data rate indicators that are relatively high, perhaps the same as or close to the highest data rate indicator. Less bandwidth-intensive application, such as e-mail and Web browsing applications could have mid-range maximum data rate indicators, e.g., a CQI index of 8. Applications that require only occasional transfer of small amounts of data, such as machine-to-machine applications, could have maximum data rate indicators that are lower still, e.g., a CQI index of 5. It is to be understood that the foregoing associations between types of applications and maximum data rate indicators are merely illustrative examples, as other associations could be used.

The WCD could also select the maximum data rate indicator based on one or more other considerations instead of, or in addition to, the type of the application that is to receive downlink data. Such other considerations could include, for example, a priority of downlink data to be received by the application, an amount of downlink data to be received by the application, a device type of the WCD, and/or a subscription level of the WCD. Other considerations are also possible.

With regard to priority of downlink data, the application that is to receive the downlink may normally be associated with a particular maximum data rate indicator, but the application's maximum data rate indicator could be increased if the application is to receive high-priority data or decreased if the application is to receive low-priority data. High-priority data could be, for example, associated with high-priority uses of the application, such as using a VoIP application for emergency communications. Low-priority data could be, for example, associated with background or low-priority uses of the application, such as the application receiving periodic updates.

With regard to the amount of downlink data, the application that is to receive the downlink data may be associated with a maximum data rate indicator that is based on the amount of downlink data that the application expects to receive. For example, a Web browsing application may be associated with a default maximum data rate indicator that is used for most Web browsing tasks. However, when the Web browsing application is instructed to perform a more bandwidth-intensive task, such as downloading a large file or streaming a video, then a higher maximum data rate indicator may be used temporarily. When the bandwidth-intensive task is completed, the default maximum data rate indicator may again be selected for the application.

With regard to the device type of the WCD, the maximum data rate indicator that is selected for an application could be based, at least in part, on the WCD's hardware and/or software configuration. As one example, a WCD that is configured for only machine-to-machine communications could be limited to a relatively low maximum data rate indicator, e.g., a CQI index of 5. As another example, whether a WCD is able to select the highest data rate indicator as the maximum data rate indicator for streaming video applications may depend on whether the WCD is able to display high definition (HD) video. Thus, a WCD that is configured with a high-resolution display and appropriate software that enable the WCD to display HD video may be able to select the highest data rate indicator (e.g., a CQI index of 15) as the maximum data rate indicator for a streaming video application. In contrast, a WCD that is not so configured may instead select something less than the highest data rate indicator (e.g., a CQI index of 14) as the maximum data rate indicator for streaming video. Other examples are possible as well.

With regard to subscription level of the WCD, the maximum data rate indicator could be based, in part, on a level of service to which the WCD's user subscribes. For example, whether a WCD selects the highest data rate indicator or something less than the highest data rate indicator as the maximum data rate indicator for a particular application may depend on whether the WCD is associated with a premium subscription level or a basic subscription level. Thus, a WCD that is associated with the premium subscription level may select the highest data rate indicator (e.g., a CQI index of 15) as the maximum data rate indicator for the particular application, whereas a WCD that is associated with a basic subscription level may select a lower data rate indicator (e.g., a CQI index of 14) as the maximum data rate indicator for the particular application. In some implementations, a WCD that is associated with a sufficient high subscription level might not limit its downlink data rate at all and, thus, might not determine a maximum data rate indicator.

In this way, block 308 may involve the WCD selecting a maximum data rate indicator from among the plurality of data rate indicators based on at least one of a type of the application, a priority of downlink data to be received by the application, an amount of downlink data to be received by the application, a device type of the WCD, or a subscription level of the WCD. The specific criteria that the WCD uses to select the maximum data rate indicator could be based on, for example, data that was provisioned in the WCD in connection with service activation, one or more instructions from the RAN, and/or one or more settings or preferences selected by a user of the WCD.

To make use of the mapping between SNR ranges and data rate indicators, the WCD may measure a SNR of a signal transmitted by the RAN, as indicated by block 310. The signal could be for example, one or more of the reference signals that the RAN transmits in each downlink resource block (i.e., the resource elements labeled "R" in FIG. 2B). The WCD may then select an applicable data rate indicator based on at least the measured SNR, the mapping, and the maximum data rate indicator, such that the applicable data indicator does not exceed the maximum data rate indicator, as indicated by block 312. In one approach, the WCD may determine which particular range of SNRs in the mapping includes the measured SNR, use the mapping to identify the particular data rate indicator that the particular range of SNRs maps to, and compare the particular data rate indicator to the maximum data rate indicator. If the particular data rate indicator is less than or equal to the maximum data rate indicator, the WCD may select the particular data rate indicator as the applicable data rate indicator. If, however, the particular data rate indicator exceeds the maximum data rate indicator, the WCD may select the maximum data rate indicator as the applicable data rate indicator.

The WCD then reports the applicable data rate indicator to the RAN, as indicated by block 314. Based on the applicable data rate indicator reported by the WCD, the RAN selects a MCS for a downlink resource block allocated to the WCD. Thus, the WCD receives from the RAN data for the application in a downlink transmission that uses the MCS associated with the applicable data rate indicator reported by the WCD, as indicated by block 316. The downlink transmission may include data for the application on the WCD, for example, in the form of a sequence of OFDM symbols. The sequence of OFDM symbols could correspond to one or more downlink resource blocks that the RAN transmits over the course of one or more slots.

As the WCD continues to receive downlink data for the application, the WCD may continue, either periodically or aperiodically, measuring SNRs of the RAN's signals, selecting applicable data rate indicators based on the measured SNRs and the mapping (so as not to exceed the maximum data rate indicator), reporting the applicable data rate indicators to the RAN, and receiving from the RAN data for the application in downlink transmissions that use MCSs associated with the applicable data rate indicator reported by the WCD. This process is indicated by the arrow going from block 316 to block 310. In this way, the RAN's transmission of the data for the application can adapt to changing RF conditions. However, if other conditions change, such as the application on the WCD receiving different priority data or the WCD running a different application, then the WCD may select a different maximum data rate indicator.

4. Example WCD

Figure 4:
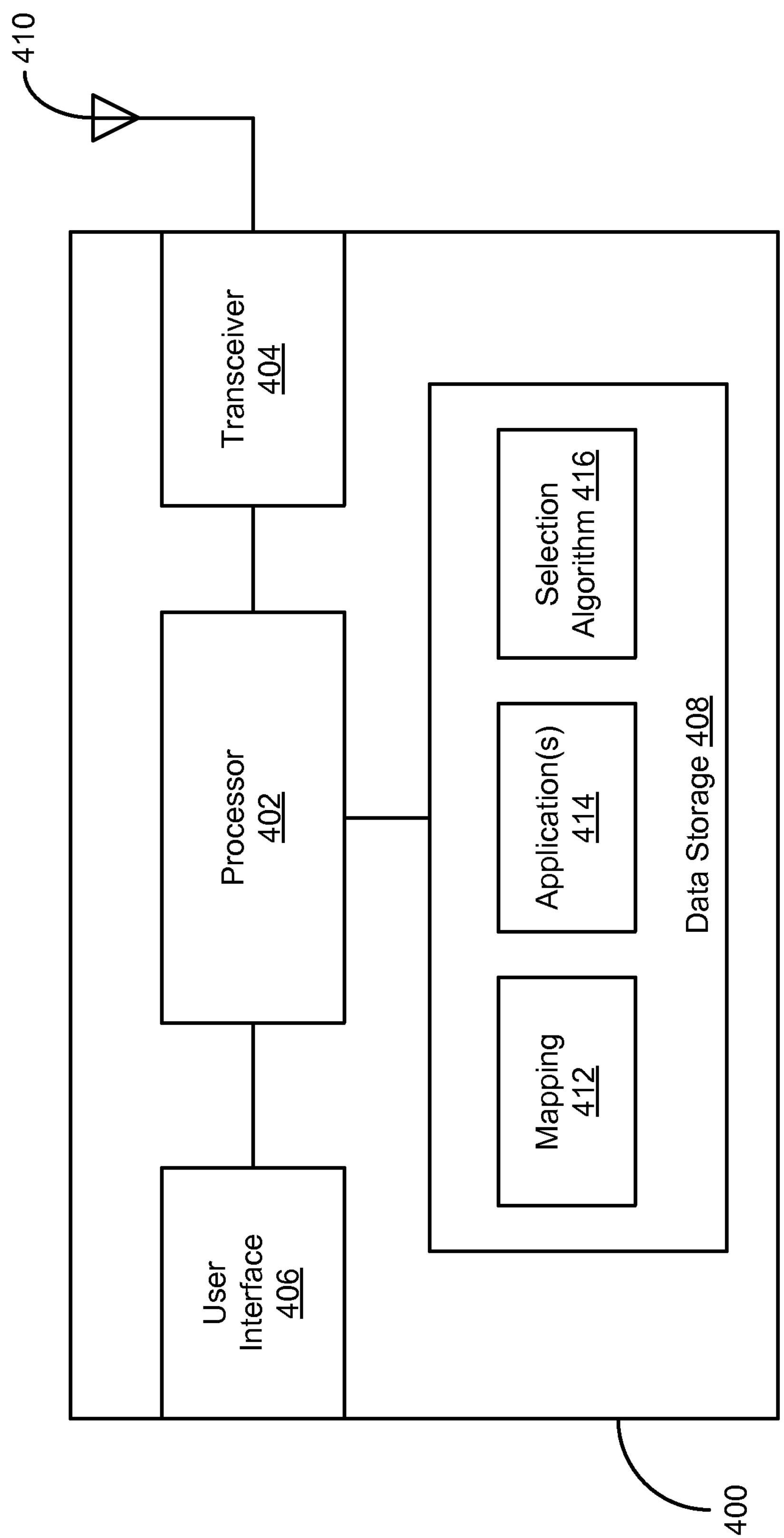
FIG. 4 is a block diagram of a wireless communication device (WCD), in accordance with an example embodiment.

FIG. 4 illustrates an example WCD 400 that can perform at least some of the functions described herein, such as method 300 shown in FIG. 3. In this example, WCD 400 includes a processor 402 that is coupled to a transceiver 404, a user interface 406, and data storage 408.

Transceiver 404 may be configured for wireless communication with a RAN, such as RAN 12. For example, transceiver 404 may include a transmitter for wirelessly transmitting uplink data to the RAN and a receiver for wirelessly receiving downlink data transmitted by the RAN. Transceiver 404 may transmit and receive wireless signals via one or more antennas, exemplified in FIG. 4 by antenna 410.

User interface 406 is configured to receive input from the user and to convey output from the user. For instance, user interface 406 may include a touch screen, a keypad, buttons, and or other controls for receiving input from the user. User interface 406 may also include a display screen for displaying textual and/or graphical information to the user. In addition, user interface 406 may include a microphone and speaker for voice communication.

Data storage 408 may include any type of non-transitory computer readable medium, such as random access memory (RAM), read-only memory (ROM), flash memory, cache memory, one or more magnetically encoded disks, one or more optically encoded disks, and/or any other type of volatile or non-volatile memory. Data storage 408 may store various kinds of data, such as a mapping 412, as well as program instructions that are executable by processor 402. The program instructions could include program instructions for one or more application(s) 414 and program instructions for a selection algorithm 416.

Mapping 412 may identify a plurality of ranges of SNRs and a plurality of data rate indicators, wherein each data rate indicator is associated with a respective MCS that supports a respective downlink data rate such that higher data rate indicators are associated with MCSs that support higher downlink data rates. Moreover, mapping 412 may be able to map each range of SNRs in the plurality of ranges of SNRs to a respective data rate indicator in the plurality of data rate indicators. In one example, the data rate indicators identified in mapping 412 are CQI indices, e.g., as shown above in Table 1. Thus, mapping 412 could be similar to the mapping shown above in Table 2.

Application(s) 414 could include any application that can be controlled by or interact with a user of WCD 400 through user interface 406. For example, application(s) 414 could include a VoIP application, video conferencing application, a streaming video application, a streaming audio application, an email application, a text messaging application, a social media application, a Web browsing application, a gaming application, a mapping application, a navigation application, a machine-to-machine application, and/or other types of applications. When in operation, an application in application(s) 414 could involve transceiver 404 transmitting uplink data to the RAN and/or transceiver 404 receiving downlink data from the RAN.

The program instructions for selection algorithm 416 may be executable by processor 402 to control the functioning of WCD 400 in accordance with any of the methods described herein. For example, the program instructions for selection algorithm 416 may be executable by processor 402 to cause WCD 400 to perform functions including: (a) identifying an application on the WCD (i.e., an application in applications 414) that is to receive downlink data from the RAN; (b) selecting a maximum data rate indicator from among the plurality of data rate indicators based on at least one of a type of the application, a priority of downlink data to be received by the application, an amount of downlink data to be received by the application, a device type of the WCD, or a subscription level of the WCD; (c) measuring a SNR of a signal transmitted by the RAN and received by the transceiver; (d) selecting an applicable data rate indicator based on at least the measured SNR, a mapping stored by the WCD (e.g., mapping 412), and the maximum data rate indicator, such that the applicable data rate indicator does not exceed the maximum data rate indicator; and (e) causing the transceiver to report the applicable data rate indicator to the RAN.

These functions associated with selection algorithm 416 may be performed as described above for FIG. 3. Thus, the maximum data rate indicator could be the highest data rate indicator in the mapping (i.e., the data rate indicator associated with a MCS that supports the highest downlink data rate), or the maximum data rate indicator could be less than the highest data rate indicator.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method, comprising:

a wireless communication device (WCD) storing a mapping between a plurality of ranges of signal-to-noise ratios (SNRs) and a plurality of data rate indicators, wherein the mapping maps each range of SNRs with a respective data rate indicator, and wherein each data rate indicator is associated with a respective modulation-and-coding scheme (MCS) that supports a respective downlink data rate, such that higher data rate indicators are associated with MCSs that support higher downlink data rates;

the WCD identifying an application on the WCD that is to receive downlink data from a radio access network (RAN);

the WCD selecting a maximum data rate indicator from among the plurality of data rate indicators based on at least a type of the application on the WCD that is to receive downlink data from the RAN, wherein the type of the application indicates an extent to which the application is bandwidth-intensive;

the WCD measuring a SNR of a signal transmitted by the RAN;

the WCD making a determination that the mapping maps the measured SNR to a data rate indicator that is higher than the maximum data rate indicator;

the WCD selecting an applicable data rate indicator, wherein the WCD selecting the applicable data rate indicator comprises the WCD selecting the maximum data rate indicator as the applicable data rate indicator based on the determination; and the WCD reporting the applicable data rate indicator to the RAN.

2. The method of claim 1, further comprising:

the WCD receiving a downlink transmission from the RAN, wherein the downlink transmission uses the MCS associated with the applicable data rate indicator and includes downlink data for the application.

3. The method of claim 2, wherein the downlink transmission from the RAN comprises a sequence of orthogonal frequency division multiplexing (OFDM) symbols.

4. The method of claim 1, wherein the plurality of data rate indicators includes a highest data rate indicator, whereby the highest data rate indicator is associated with a MCS that supports a highest downlink data rate.

5. The method of claim 4, wherein the maximum data rate indicator is the highest data rate indicator.

6. The method of claim 5, wherein the application is a video application.

7. The method of claim 4, wherein the maximum data rate indicator is not the highest data rate indicator, whereby the maximum data rate indicator is associated with a MCS that supports a downlink data rate that is less than the highest downlink data rate.

8. The method of claim 7, wherein the application is an e-mail application or a Web browsing application.

9. The method of claim 1, wherein the data rate indicators are channel quality indicator (CQI) indices.

10. The method of claim 9, wherein the CQI indices range from 0 to 15.

11. The method of claim 10, wherein the WCD selecting a maximum data rate indicator from among the plurality of data rate indicators comprises the WCD selecting a maximum CQI index that is less than 15.

12. A wireless communication device (WCD) comprising:

a transceiver for wireless communication with a radio access network (RAN);

a processor;

data storage;

a mapping stored in the data storage, wherein the mapping maps each range of signal-to-noise ratios (SNRs) in a plurality of ranges of SNRs to a respective data rate indicator in a plurality of data rate indicators, and wherein each data rate indicator is associated with a respective modulation-and-coding scheme (MCS) that supports a respective downlink data rate, such that higher data rate indicators are associated with MCSs that support higher downlink data rates;

program instructions stored in the data storage, wherein the program instructions are executable by the processor to cause the WCD to perform functions comprising:

identifying an application on the WCD that is to receive downlink data from the RAN;

selecting a maximum data rate indicator from among the plurality of data rate indicators based on at least a type of the application on the WCD that is to receive downlink data from the RAN, wherein the type of the application indicates an extent to which the application is bandwidth-intensive;

measuring a SNR of a signal transmitted by the RAN and received by the transceiver;

making a determination that the mapping maps the measured SNR to a data rate indicator that is higher than the maximum data rate indicator;

selecting an applicable data rate indicator, wherein selecting the applicable data rate indicator comprises selecting the maximum data rate indicator as the applicable data rate indicator based on the determination; and causing the transceiver to report the applicable data rate indicator to the RAN.

13. The WCD of claim 12, wherein the plurality of data rate indicators includes a highest data rate indicator, whereby the highest data rate indicator is associated with a MCS that supports a highest downlink data rate.

14. The WCD of claim 13, wherein the maximum data rate indicator is the highest data rate indicator.

15. The WCD of claim 13, wherein the maximum data rate indicator is not the highest data rate indicator, whereby the maximum data rate indicator is associated with a MCS that supports a downlink data rate that is less than the highest downlink data rate.

16. The WCD of claim 12, wherein the data rate indicators are channel quality indicator (CQI) indices.

* * * * *